(12) United States Patent
Sakamoto et al.

(10) Patent No.: US 7,327,527 B2
(45) Date of Patent: Feb. 5, 2008

(54) LENS SUPPORTING FRAME OF LENS DEVICE AND METHOD OF ADJUSTING THE SAME

(75) Inventors: Kenichi Sakamoto, Saitama (JP); Tomonari Masuzawa, Saitama (JP); Takao Araki, Saitama (JP)

(73) Assignee: Fujinon Corporation, Saitama (JP)

( * ) Notice: Subject to any disclaimer, the term of this patent is extended or adjusted under 35 U.S.C. 154(b) by 88 days.

(21) Appl. No.: 11/174,742

(22) Filed: Jul. 6, 2005

(65) Prior Publication Data
US 2006/0007567 A1  Jan. 12, 2006

(30) Foreign Application Priority Data
Jul. 6, 2004  (JP) .............................. 2004-199257

(51) Int. Cl.
G02B 7/02 (2006.01)
G02B 15/14 (2006.01)

(52) U.S. Cl. ...................... 359/822; 359/819; 359/700; 359/701

(58) Field of Classification Search ................. 359/822
See application file for complete search history.

(56) References Cited
U.S. PATENT DOCUMENTS 4,989,950 A *  2/1991  Nakauchi .................... 359/818
5,774,282 A *  6/1998  Kohmoto et al. ........... 359/823
6,388,825 B1 *  5/2002  Koiwai et al. .............. 359/819
2001/0055164 A1* 12/2001  Dou et al. .................. 359/823
2003/0076602 A1*  4/2003  Nishikawa .................. 359/819

FOREIGN PATENT DOCUMENTS
JP  2003-202479  7/2003

OTHER PUBLICATIONS
English Translation of Mikami et al. (JP 2000-321476), Nov. 24, 2000.*

* cited by examiner

Primary Examiner—Ricky Mack
Assistant Examiner—Vipin M Patel
(74) Attorney, Agent, or Firm—Young & Thompson (57) ABSTRACT

A lens supporting frame is provided and includes a lens holder supporting a lens and a moving frame which is fitted to a cylindrical part of the lens holder to support the same. Ribs are provided at equal intervals in a rotation direction on a rear end face of the lens holder, the ribs having a plurality of inclined surfaces inclined respectively toward the front or rear ends of an optical axis. Abutting parts are provided on a rear end face of the moving frame so as to abut on the ribs. When the lens holder is rotated after mounting it in the moving frame, parts of the lens holder facing the abutting parts are moved in directions along the optical axis as a result of abutment between the inclined surfaces of the ribs and the abutting parts to change the inclination of the lens holder relative to the optical axis.

12 Claims, 12 Drawing Sheets

LENS SUPPORTING FRAME OF LENS DEVICE AND METHOD OF ADJUSTING THE SAME

FIELD OF THE INVENTION

The present invention relates to a lens device in which a plurality of lens groups are mounted in a cam cylinder and in which the lens groups are moved in a direction along the optical axis of the device through a rotation of the cam cylinder and, more particularly, to a structure of a lens frame for supporting the lenses and a method of adjusting the same.

BACKGROUND OF THE INVENTION

A zoom lens device which is a lens device capable of obtaining different focal lengths alone has been used in optical products such as cameras and projectors. In such a zoom lens device, as disclosed in JP-A-2003-202479, a plurality of lens groups is mounted in a mirror barrel, and the lens groups are moved in directions along the optical axis to vary the magnification and to perform focusing.

Each of the lens groups includes at least one lens and an annular lens supporting frame for supporting the lens. For example, three cam followers in the form of pins are radially erected on the outer circumference of the lens supporting frame such that they define equal angles. The mirror barrel includes a zoom cam cylinder formed with a plurality of curved cam grooves into which the cam followers on the lens supporting frame are inserted and a fixed cylinder formed with a plurality of straight cam grooves extending along the optical axis. The cam followers are pushed into the curved cam grooves as a result of a rotation of the zoom cam cylinder to move each of the lens groups along the straight cam grooves in a direction along the optical axis.

In order to obtain high image quality with a zoom lens device, the inclination of each lens group with reference to the optical axis must be small. In the case of the zoom lens device disclosed in JP-A-2003-202479, eccentric rollers are attached to the three cam followers, and the eccentric rollers are rotated with the lens supporting frame mounted in the zoom cam cylinder and the fixed cylinder to change the state of abutment between the cam grooves and the cam followers, thereby adjusting the inclination of each lens group with reference to the optical axis.

However, according to the adjusting method utilizing eccentric rollers disclosed in JP-A-2003-202479, it is difficult to manage and control the direction and amount of a movement of apart of the lens supporting frame that is caused by a rotation of any of eccentric rollers associated with the three cam followers, and such an operation has been time-consuming and has therefore resulted in a cost increase.

SUMMARY OF THE INVENTION

An object of an illustrative, non-limiting embodiment of the invention is to overcome the disadvantages described above and to allow the inclination of a lens group with reference to an optical axis to be easily and accurately adjusted. Also, the invention is not required to overcome the disadvantage described above, and an illustrative, non-limiting embodiment of the invention may overcome a different disadvantage or may not overcome any disadvantages.

A lens supporting frame of a lens device according to an illustrative, non-limiting embodiment of the invention includes: a lens holder supporting a lens; and a moving frame supporting the lens holder and having the plurality of cam followers disposed on the outer circumference thereof.

Further, ribs are provided on one of the lens holder and the moving frame, each of the ribs having a surface that is inclined in a direction along an optical axis and being disposed in a rotation direction of the optical axis, and abutting parts abutting on the ribs are provided at the other of the lens holder and the moving frame.

The ribs and the abutting parts may be provided in a plurality of locations at equal intervals in the rotation direction. Each of the ribs may include a plurality of surfaces inclined in different directions. That is, the plurality of surfaces includes a surface (a first surface) inclined in a direction along the optical axis and another surface (a second direction) inclined in the other direction (the opposite direction) along the optical axis). The plurality of surfaces is serially arranged in the rotation direction. At least one of the surfaces of each rib may be inclined in the direction opposite to that of the corresponding surface of another rib.

Further, the lens holder and the moving frame may be preliminarily coupled by engaging an engaging part formed on one of the lens holder and the moving frame with a part to be engaged formed on the other of the lens holder and the moving frame or by sandwiching a part to be sandwiched formed on each of the lens holder and the moving frame with an elastic member. The lens holder and the moving frame may be coupled with an adhesive or a screw.

In a method of adjusting a lens supporting frame of a lens device according to an illustrative, non-limiting embodiment of the invention, the lens holder supporting a lens is mounted in the moving frame that is mounted in the cam cylinder, and the lens holder in the moving frame is rotated to move the lens holder in a direction along the optical axis through abutment between each rib and the respective abutting part. After the adjustment (i.e., the abutment between the ribs and the abutting parts), the amount of abutment between a screw engaged with the moving frame and the lens holder may be increased or decreased to perform a further adjustment and to couple the moving frame and the lens holder.

In the lens supporting frame and the method of adjusting the same according to the invention, it is possible to know the direction and amount of a movement of a part of the lens holder by checking the state of abutment between the ribs and the abutting parts. Further, an adjusting operation requires neither complicated apparatus nor skillfulness in the operation because it can be performed only by rotating the lens holder. Since the operation of adjusting the inclination of a lens group can be easily and accurately performed in a short time for those reasons, a lens device can be provided at a low cost with improved productivity. Further, since the inclination of each lens group can be accurately adjusted, it is possible to realize a difficult lens design for which accurate adjustment is a prerequisite.

Further, since the preliminary coupling units is provided on the lens holder and the moving frame, even when the user releases the lens holder on the way of adjustment, the adjustment which has been made until that time will not become useless, which contributes to an improvement of operational efficiency. Since the inclination of the lens holder can be further adjusted with the screws engaged with the moving frame after the adjustment using the ribs and the abutting parts, a wide range of adjustment can be achieved.

DETAILED DESCRIPTION OF THE INVENTION

An exemplary embodiment of the invention will now be described with reference to drawings.

Figure 1:
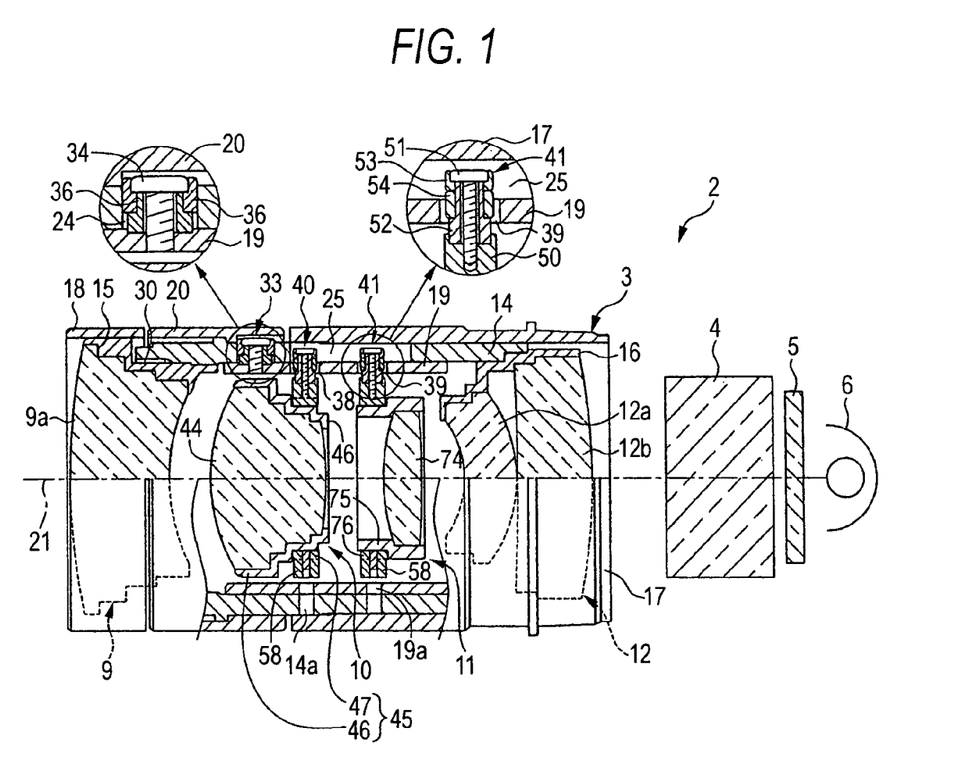
FIG. 1 is a sectional view of major parts of an image projection unit utilizing a lens device including a lens supporting frame according to an illustrative, non-limiting embodiment of the invention showing a configuration of the unit.

FIG. 1 shows an image projection unit of a projector. An image projection unit 2 includes a zoom lens device 3, a dichroic prism 4, a transmissive image display 5 such as an LCD, and a projection lamp 6. Light emitted by the projection lamp 6 is transmitted by the transmissive image display 5 to enter the dichroic prism 4. Images in RGB type three primary colors displayed on the transmissive image display 5 are synthesized by the dichroic prism 4, and the resultant image is projected on a screen by the zoom lens device 3.

The zoom lens device 3 includes a first lens group 9 serving as a front converter having a focusing function, a second lens group 10 serving as a variator, a third lens group 11 serving as a compensator, a fourth lens group 12 serving as a relay lens, a fixed cylinder 14, a focus cylinder 15, a relay cylinder 16, an outer cylinder 17, a focus ring 18, a zoom cam cylinder 19, and a zoom ring 20. A magnification change is made by moving the second lens group 10 and the third lens group 11 in directions along an optical axis 21 (i.e., a direction to the front end of the lens device or a direction to the rear end of the lens device), and focusing is performed by moving the first lens group 9 in directions along the optical axis 21.

Figure 2:
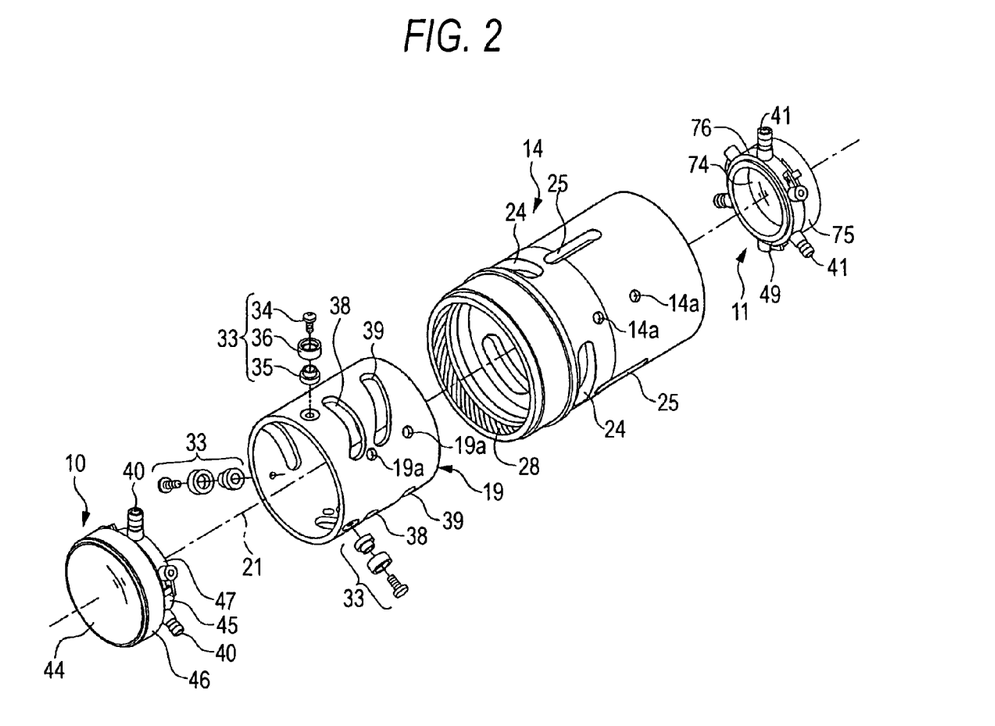
FIG. 2 is an exploded perspective view of zooming-related components of a zoom lens device.

As shown in FIG. 2, the fixed cylinder 14 is formed with three rotary cam grooves 24 having a shape extending in a rotation direction and three linear cam grooves 25 having a shape extending along the optical axis 21, each group of grooves being provided at equal angles of 120° in the rotation direction of the optical axis 21. The first lens group 9 and the fourth lens group 12 are mounted on the front and rear ends of the fixed cylinder 12, respectively. The first lens group 9 includes a first lens 9a and a focus cylinder 15 supporting the lens. The fourth lens group 12 includes fourth lenses 12a and 12b and a relay cylinder 16 supporting the lenses. The outer cylinder 17 is attached to the outer circumference of the fixed cylinder 14 with screws which are not shown to cover the fixed cylinder 14 and the relay cylinder 16. The zoom lens device 3 is attached to the projector through the outer cylinder 17.

A male helicoid 28 is formed on the inner circumference of the fixed cylinder 14 at the front end thereof, and a female helicoid 30, which engages the male helicoid 28, is formed on the outer circumference of the focus cylinder 15 at the rear end thereof. Therefore, when the focus cylinder 15 is rotated using the focus ring 18 which is attached to the outer circumference of the focus cylinder 15 with a screw (not shown), the first lens group 9 is advanced or retracted by the lead of the helicoids in a direction along the optical axis to perform focus adjustment. The focus cylinder 15 is stopped by a screw which is not shown such that it will not come off the fixed cylinder 14.

The zoom cam cylinder 19 is rotatably accommodated in the fixed cylinder 14. Three cam followers 33, which are inserted in the rotary cam grooves 24 on the fixed cylinder 14, are attached to the outer circumference of the zoom cam cylinder 19. Each of the cam followers 33 includes a cam pin 35 which is secured on the outer circumference of the zoom cam cylinder 19 with a screw 34 and a cam roller 36 which is rotatably held between the cam pin 35 and the screw 34. The cam roller 36 rotates so as to facilitate the movement of the cam follower 33 in the rotary cam groove 24. Each of the cam followers 33 outwardly protrudes from the rotary cam groove 24 on the fixed cylinder 14 to be engaged with the zoom ring 20 which is provided outside the fixed cylinder 14. Therefore, the zoom cam cylinder 19 is rotated in the fixed cylinder 14 as the zoom ring 20 rotates.

Three pairs of zoom cam grooves 38 and 39 to be used for moving the second lens group 10 and the third lens group 11 in a direction along the optical axis are formed on the outer circumference of the zoom cam cylinder 19, the pairs of grooves being provided so as to define equal angles of 120° in the rotation direction. Three each cam followers 40 and 41 are formed on the outer circumference of lens supporting frames 45 and 49, respectively, in association with the second lens group 10 and the third lens group 11. The cam followers 40 and 41 are inserted into the zoom cam grooves 38 and 39, respectively, and into the straight cam grooves 25 on the fixed cylinder 14.

When the zoom cam cylinder 19 is rotated by the zoom ring 20, the zoom cam grooves 38 and 39 press the cam followers 40 and 41 of the second lens group 10 and the third lens group 11, respectively. The cam followers 40 and 41 pressed by the zoom cam grooves 38 and 39 cause the second lens group 10 and the third lens group 11 to move along the optical axis 21 through the linear cam grooves 25, thereby changing the magnification. The zoom lens device 3 is mounted in the projector main body such that a front part thereof including the zoom ring 20 is exposed. A magnification change and focusing is achieved by operating the zoom ring 20 and the focus ring 18 with a hand.

Figure 3:
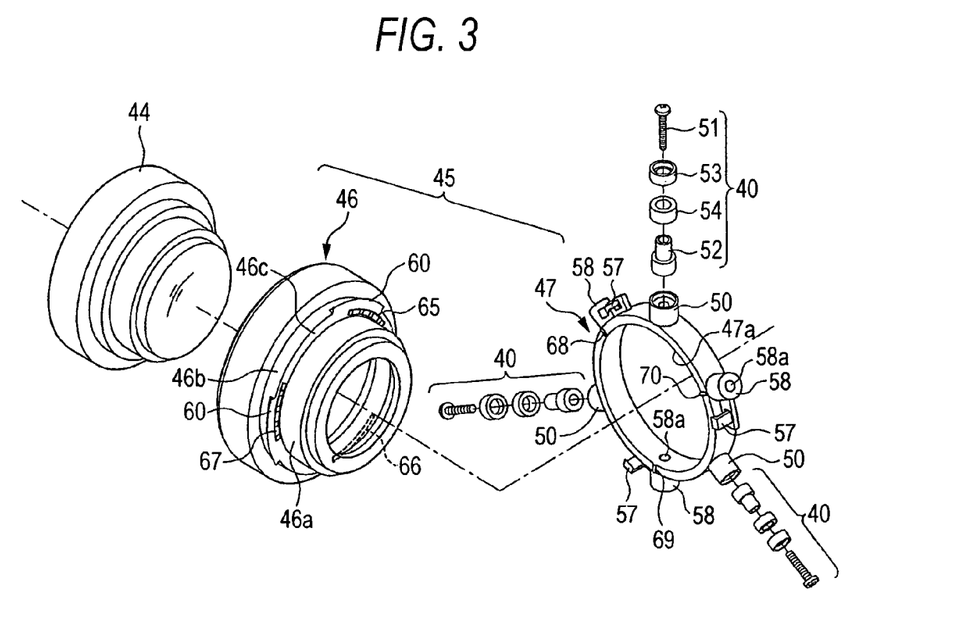
FIG. 3 is an exploded perspective view of a second lens group showing a configuration of the same.

As shown in FIG. 3, the second lens group 10 includes a second lens 44, a lens supporting frame 45 for holding the second lens 44, and three cam followers 40 which are attached to the outer circumference of the lens supporting frame 45 at equal angular intervals. The lens supporting frame 45 includes a cylindrical lens holder 46 for supporting the second lens 44 and a moving frame 47 for supporting the lens holder 46 in the zoom cam cylinder 19. Those elements are coupled together by fitting a cylindrical part 46a of the lens holder 46 into a part 47a defining the inner diameter of the moving frame 47.

Three cam bosses 50 to which the cam followers 40 are attached are provided on the outer circumference of the moving frame 47, the bosses being provided at equal intervals of 120° in association with the linear cam grooves 25. A cam follower 40 includes a cam pin 52 which is attached to the cam boss 50 with a screw 51 and two cam rollers 53 and 54 which are rotatably held between the cam pin 52 and the screw 51. The cam rollers 53 and 54 allow smooth slide in the linear cam grooves 25 on the fixed cylinder 14 and the zoom cam grooves 38 and 39 on the zoom cam cylinder 19.

Three engaging nails 57 used for, preliminarily coupling the moving frame 47 and the lens holder 46 and three coupling bosses 58 used for completely coupling the moving frame 47 and the lens holder 46 are provided on an outer circumferential surface of the moving frame 47 between the cam bosses 50 at equal intervals of 120° in the rotation direction.

Figure 4:
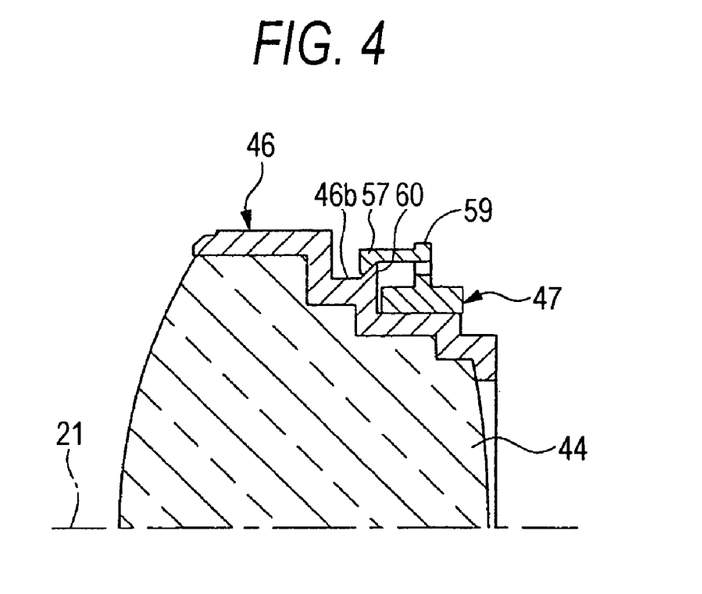
FIG. 4 is a sectional view of major parts showing a state of preliminary coupling achieved with engaging nails and engaged parts.

As shown in the sectional view of major parts in FIG. 4, the engaging nails 57 are provided on protruding pieces 59 radially erected on an outer circumferential surface of the moving frame 47 such that they elastically protrude toward the optical axis 21. The engaging nails 57 engage parts 60 to be engaged in the form of ribs provided on an outer circumferential surface of a cylindrical part 46b of the lens holder 46 to achieve preliminary mounting of the lens holder 46 on the movable frame 47. The parts 60 to be engaged are provided in the form of ribs such that they can be engaged with the engaging nails 57 even when the lens holder 46 deviates from a mounting position in the rotation direction, and three such parts are provided at equal intervals of 120° in the rotation direction in association with the engaging nails 57.

Figure 5:
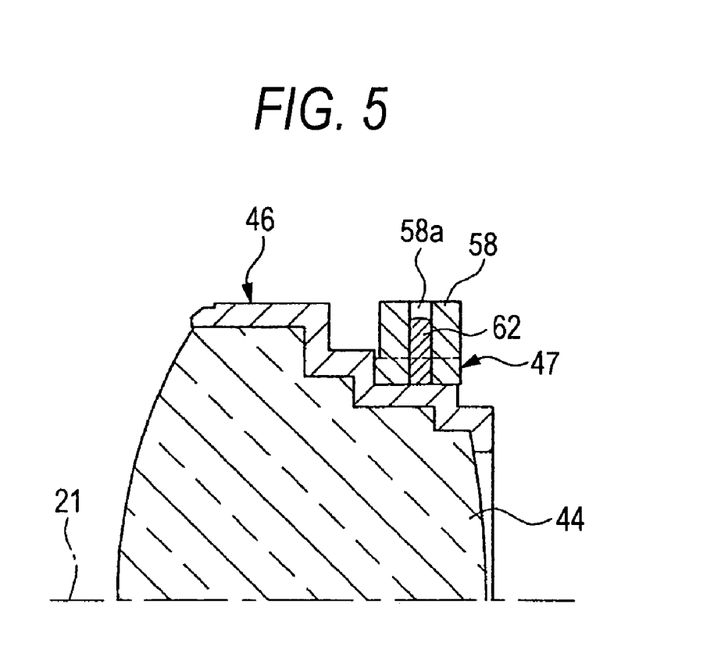
FIG. 5 is a sectional view of major parts showing a state of complete coupling achieved with coupling bosses and an adhesive.

As shown in the sectional view of major parts in FIG. 5, the coupling bosses 58 are in the form of cylinders disposed radially with respect to the optical axis 21. After the lens holder 46 and the moving frame 47 are preliminarily coupled by the engaging nails 57, an adhesive 62 is poured into a hole 58a in each of the coupling bosses 58 to couple the lens holder 46 and the moving frame 47 such that no slip occurs between them. The coupling between the lens holder 46 and the moving frame 47 with the adhesive 62 is carried out while those elements are mounted in the fixed cylinder 14 and the zoom cam cylinder 19. For this purpose, the fixed cylinder 14 and the zoom cam cylinder 19 are formed with two each work holes 14a and 19a, respectively, in positions where they face the coupling bosses 58 on the second lens group 10 and the third lens group 11, respectively.

The lens holder 46 and the moving frame 47 are formed from plastic using an injection molding process. A Lens supporting frame according to the related art comprises a lens holder and a moving frame which are integrally formed. It is therefore necessary to provide a multiplicity of sliding parts in a mold to be used for injection molding of such an element, which has resulted in the problem of a cost increase and a reduction in the accuracy of molding. In order to solve the problem, according to the invention, the lens holder 46 and the moving frame 47 are formed as separate elements and then coupled together to form the lens supporting frame 45. Since this allows the structure of a mold for the element to be simplified, a cost reduction can be achieved. Further, since the accuracy of molding is improved, optical performance can be improved.

Figure 6:
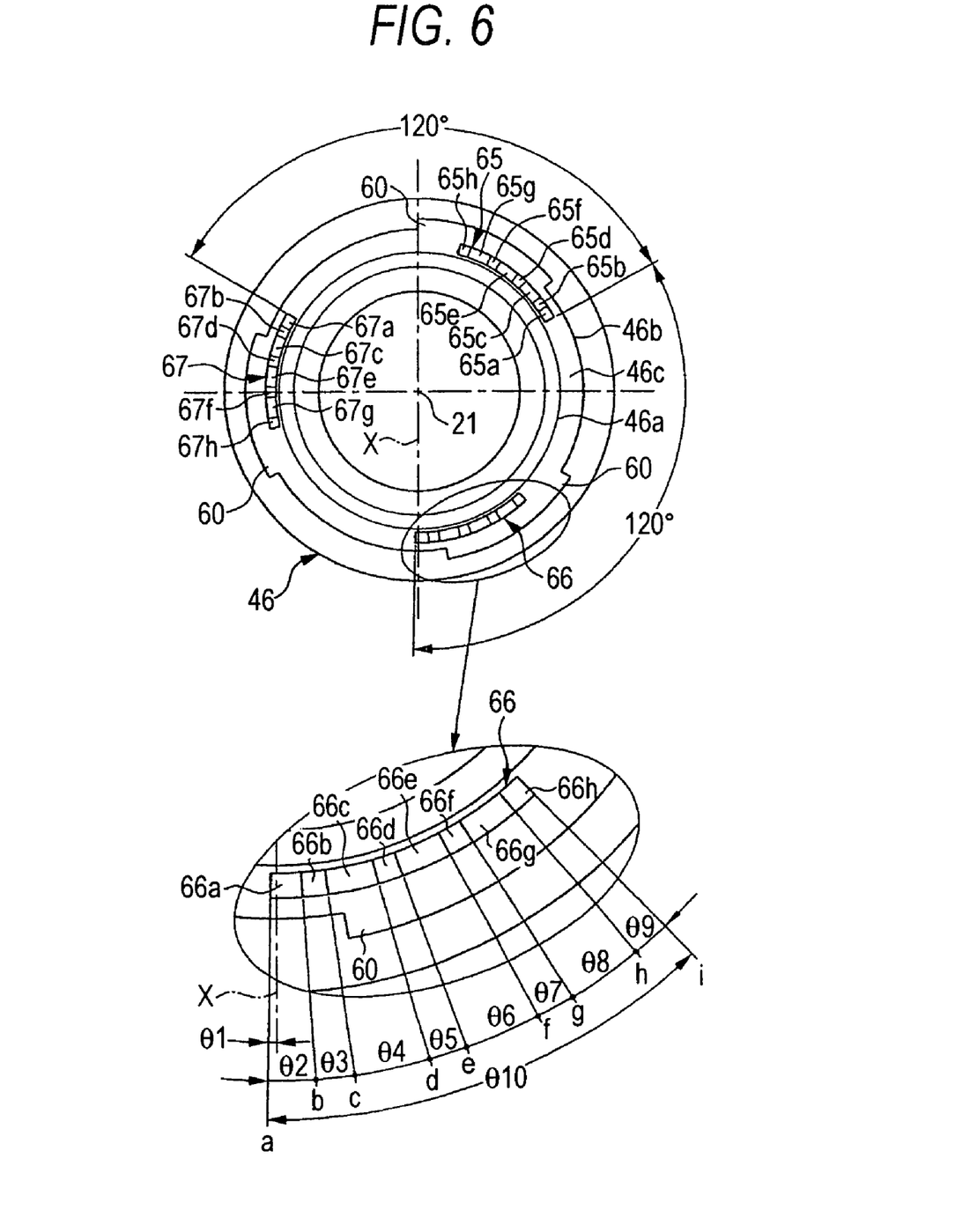
FIG. 6 is a rear view of a lens holder showing the disposition of ribs thereon.

Three ribs 65, 66, and 67 are provided on a rear end face 46c of the lens holder 46 at equal intervals of 120° in the rotation direction. Three abutting parts 68, 69, and 70 are formed on a front end face of the moving frame 47 in positions where the parts will abut on the ribs 65, 66, and 67, respectively. As shown in FIG. 6 which is a rear view of the lens holder 46, for example, the rib 66 is divided by lines a to i radially extending from the optical axis 21 into a reference surface 66a, a first inclined surface 66c, a second inclined surface 66e, a third inclined surface 66g, and sections located between those surfaces to form transitions in inclination between the inclined surfaces, i.e., a first inclination transition surface 66b, a second inclination transition surface 66d, a third inclination transition surface 66f, and a fourth inclination transition surface 66h.

The line a is at a clockwise angle θ1 (e.g., 1°) to a reference line X in the vertical direction. The lines b to i are at counterclockwise angles of θ2 to θ9, respectively, to the line a which serves as a reference, the total of the angles being represented by θ10. In the present embodiment, for example, the angle θ2 is 5°; the angles θ3, θ5, θ7, and θ9 are 4°; the angles θ4, θ6, and θ8 are 8°; and the angle θ10 is 45°.

Although the ribs 65 and 67 will not be described in detail because they are identical to the rib 66 in configuration, they have reference surfaces 65a and 67a, first inclined surfaces 65c and 67c, second inclined surfaces 65e and 67e, third inclined surfaces 65g and 67g, and sections located between those surfaces to form transitions in inclination between the inclined surfaces, i.e., first inclination transition surfaces 65b and 67b, second inclination transition surfaces 65d and 67d, third inclination transition surfaces 65f and 67f, and fourth inclination transition surfaces 65h and 67h, respectively, the surfaces being divided at the same angles as described above.

Figure 7A:
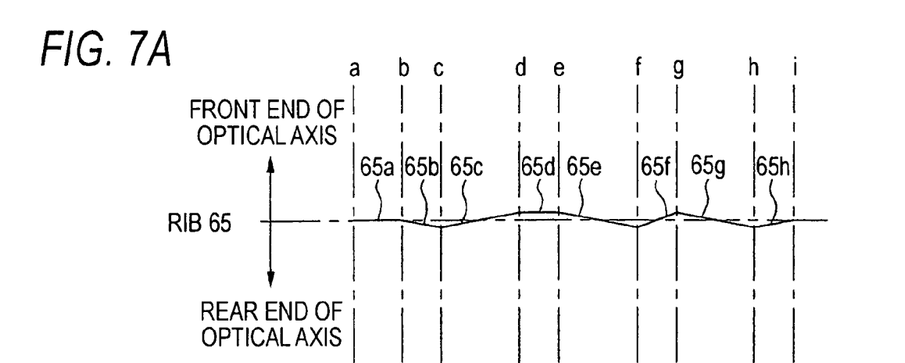
FIGS. 7A to 7C are graphs showing the directions of inclination of inclined surfaces on each of the ribs.
Figure 7B:
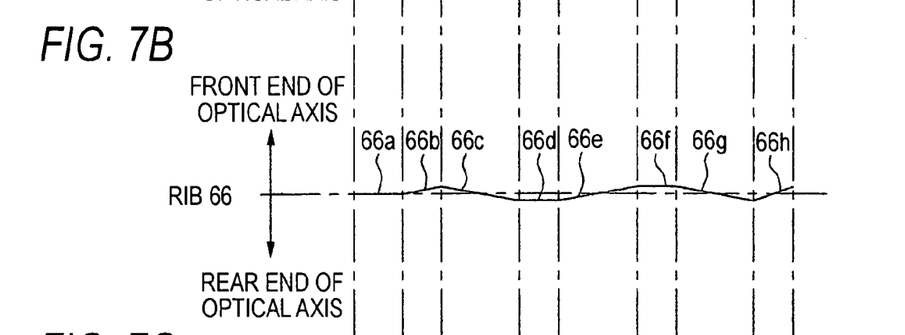
Figure 7C:
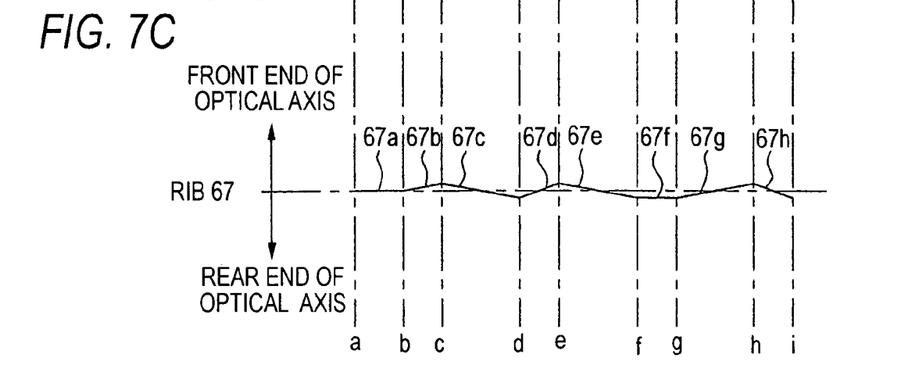

FIGS. 7A to 7C are graphs showing the direction of the inclination of each surface of the ribs 65 to 67, respectively. The reference surfaces 65a, 66a, and 67a of the respective ribs 65, 66, and 67 defined by the lines a and b are surfaces perpendicular to the optical axis 21, and the rest of the inclined surfaces are inclined toward the front end or rear end of the optical axis with reference to the respective reference surfaces 65a, 66a, and 67a. When the molding accuracy of the lens holder 46 and the moving frame 47 is high, the second lens group 10 can be properly inclined by putting the abutting parts 68 to 70 of the moving frame 47 in abutment on the respective reference surfaces.

Referring to the first inclined surfaces 65c, 66c, and 67c defined clockwise by the lines c and d in FIG. 6, the surface 65c of the rib 65 is inclined toward the front end of the optical axis, and the surfaces 66c and 67c of the ribs 66 and 67 are inclined toward the rear end of the optical axis. Referring to the second inclined surfaces 65e, 66e, and 67e defined by the lines e and f, similarly, the surface 66e of the rib 66 is inclined toward the front end of the optical axis, and the surfaces 65e and 67e of the ribs 65 and 67 are inclined toward the rear end of the optical axis. Referring further to the second inclined surfaces 65g, 66g, and 67g defined by the lines g and h, the surface 67g of the rib 67 is inclined toward the front end of the optical axis, and the surfaces 65e and 66e of the ribs 65 and 66 are inclined toward the rear end of the optical axis. That is, at least one of the inclined surfaces in each of the ribs (e.g., 65c) is inclined in one direction along the optical axis, and a surface in another of the ribs corresponding to the at least one of the surface (e.g., 66c or 67c) is inclined in the other direction along the optical axis.

Therefore, when the lens holder 45 is rotated clockwise in FIG. 3 to change the inclined surfaces in abutment with the abutting parts 68 to 70 of the moving frame 47, any one of the three locations of the lens holder 47 associated with the abutting parts 68 to 70 moves toward the front end of the optical axis, and the remaining two locations move toward the rear end of the optical axis. The inclined surfaces of the ribs 66 and 67 are formed so as to protrude by, for example, 0.5 mm each toward the front and rear ends of the optical axis with reference to the reference surfaces in order to form inclinations relative to the reference surfaces.

It is thus possible to determine the direction and amount of a movement of a part of the lens holder 46 easily by checking the state of abutment between the ribs 65 to 67 and the abutting parts 68 to 70. An adjusting operation requires neither complicated apparatus nor skillfulness in the operation because it can be performed only by rotating the lens holder 46. Since the operation of adjusting the inclination of the lens group 10 can be easily and accurately performed in a short time, the lens device 3 can be provided at a low cost with improved productivity. Further, since the inclination of each lens group can be accurately adjusted, it is possible to realize a difficult lens design for which accurate adjustment is a prerequisite.

Even when the lens holder 46 slightly moves in a direction along the optical axis, since the engaging nails 57 elastically deform to absorb the amount of the movement, the engaging nails 57 and the parts 60 to be engaged will not be disengaged from each other. Therefore, even when the user releases the lens holder 46 on the way of adjustment, the adjustment which has been made until that time will not become useless.

The third lens group 11 includes a third lens 74 and a lens supporting frame 49 supporting the third lens 74. The lens supporting frame 49 includes a lens holder 75 supporting the third lens 74 and a moving frame 76 supporting the lens holder 75. Three cam followers 41 are attached to the outer circumference of the moving frame 76. The moving frame 76 used is identical to the moving frame 47, and a reduction of the initial cost is therefore achieved through the use of common components. Although not described in detail, engaging nails, engaged parts, coupling bosses, ribs, and abutting parts similar to those of the second lens group 10 are provided between the lens holder 75 and the moving frame 76 of the third lens group 11, and the inclination of the third lens 74 with reference to the optical axis 21 can be adjusted by rotating the lens holder 75.

Figure 8:
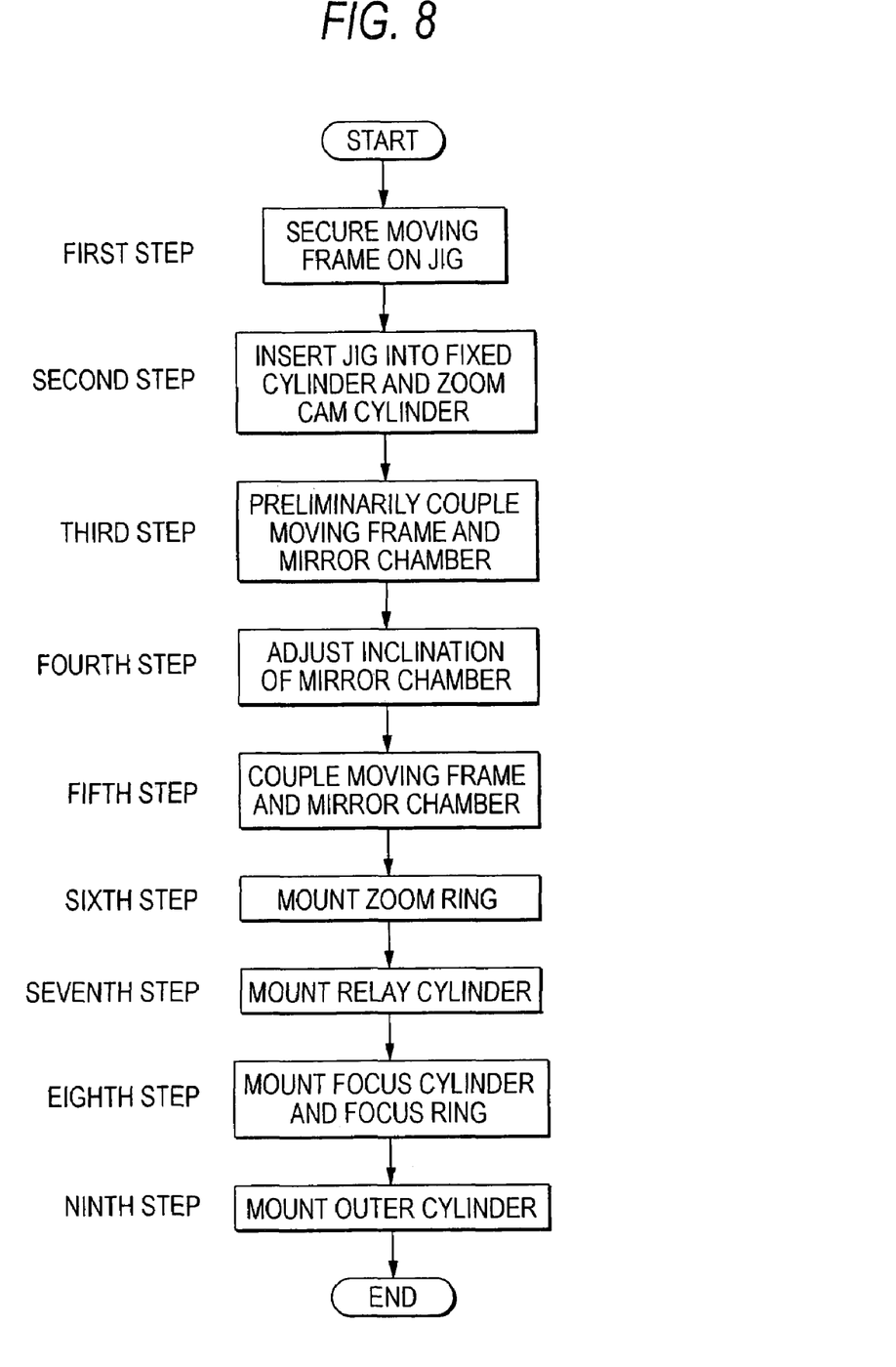
FIG. 8 is a flow chart showing steps for manufacturing a zoom lens device.
Figure 9:
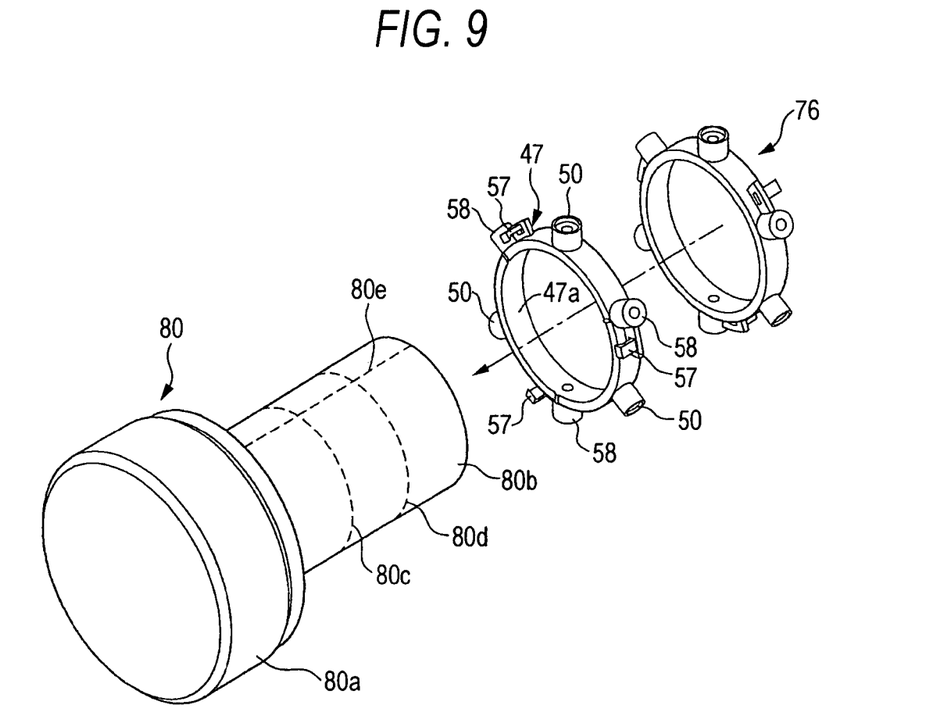
FIG. 9 is an external perspective view showing a configuration of a jig.
Figure 10:
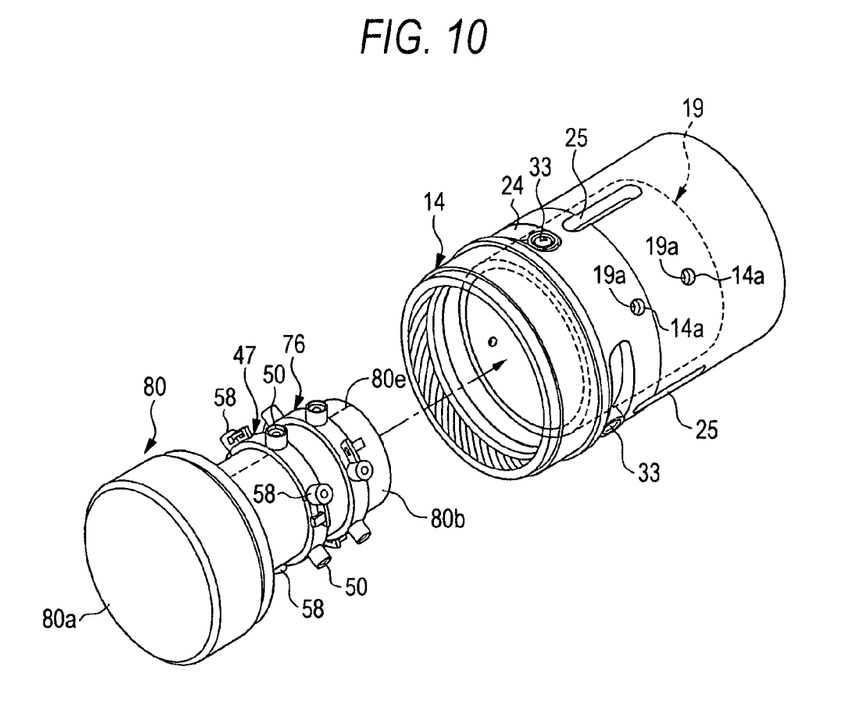
FIG. 10 is an external perspective view showing how moving frames are held by the jig.

A method of manufacturing the zoom lens device will now be described. For example, the zoom lens device is manufactured through first to ninth steps shown in FIG. 8. At the first step, as shown in FIGS. 9 and 10, two moving frames 47 and 76 are mounted on a rod-shaped jig 80. The jig 80 is formed with high precision from plastic or metal, and the jig includes a positioning part 80a which is inserted into a fixed cylinder 14 and positioned by being put into abutment on an inner circumferential surface at a front end of the cylinder and a ring holding part 80b for holding two moving frames 47 and 76.

The ring holding part 80b has such a diameter that the part can be inserted into the moving frames 47 and 76 with a fit tight enough to prevent the moving frames from coming off easily, and the part has two positioning lines 80c and 80d extending along a rotation direction of the same and a straight positioning line 80e extending along the optical axis. The two positioning lines 80c and 80d extending along the rotation direction indicate positions for holding the moving frames 47 and 76, respectively, and end faces of the moving frames 47 and 76 are aligned with the lines, respectively. The straight positioning line 80e indicates the position of upper bosses 50 on the moving frames 47 and 76, and the line is used as an index when the jig is mounted in the fixed cylinder 14.

Figure 11:
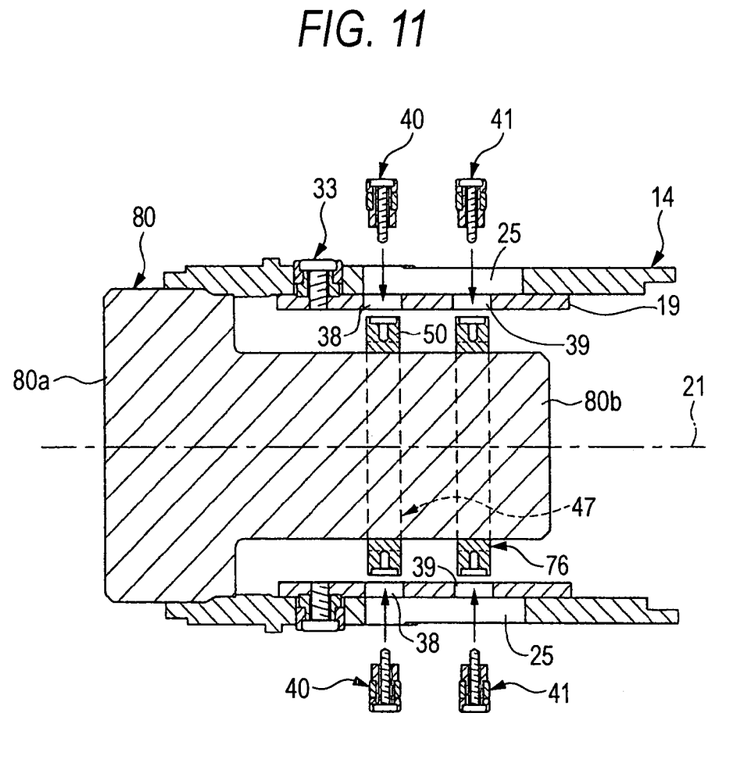
FIG. 11 is a sectional view of major parts showing how the jig is inserted into a fixed frame and a zoom cam frame.
Figure 12:
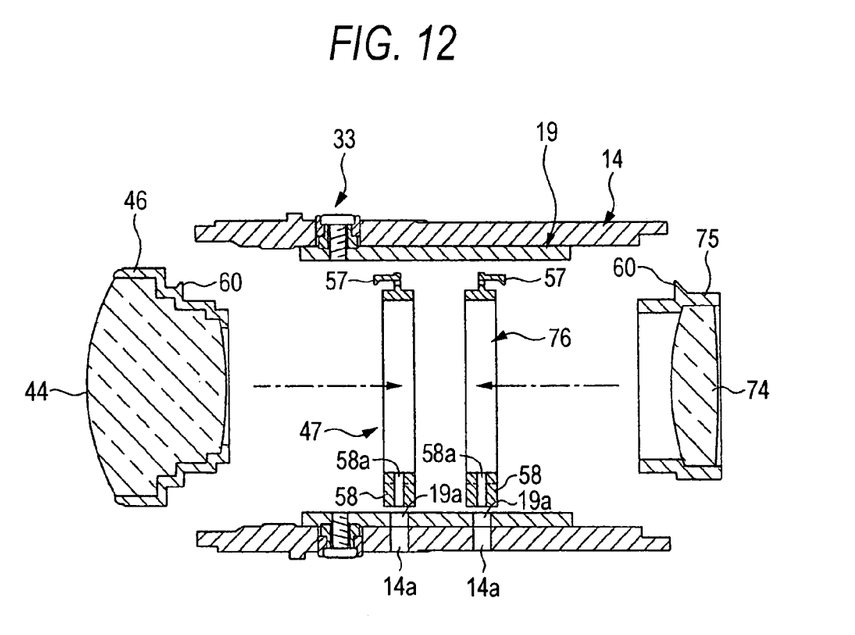
FIG. 12 is a sectional view of major parts showing a method of mounting lens holders in movable frames.

At the second step, the jig 80 is inserted into a zoom cam cylinder 19 mounted in the fixed cylinder 14. As shown in FIG. 11, the outer circumference of the positioning part 80a of the jig 80 inserted in the fixed cylinder 14 abuts on the inner circumferential surface of the fixed cylinder 14 at the front end thereof, and the amount of insertion of the jig along the optical axis 21 is thereby regulated. When the jig 80 is located to such a position that the straight positioning line 80e on the jig 80 can be seen through a straight cam groove 25 on the fixed cylinder 14, bosses 50 on the moving frames 47 and 76 held on the jig 80 are aligned with linear cam grooves 25 on the fixed cylinder 14 and zoom cam grooves 38 and 39 on the zoom cam cylinder 19. As shown in FIG. 12, coupling bosses 58 on the moving frames 47 and 76 are in a face-to-face relationship with work holes 14a and 19a on the fixed cylinder 14 and the zoom cam cylinder 19, respectively.

Thus, cam followers 40 and 41 can be attached to the moving frames 47 and 76 from the outside of the fixed cylinder 14 to support the moving frames 47 and 76 in the zoom cam cylinder 19. Since the moving frames 47 and 76 are mounted in the fixed cylinder 14 and the zoom cam cylinder 19 by holding them with the jig 80 as thus described, the accuracy of mounting of the moving frames 47 and 76 in the cylinders 14 and 19 is significantly improved.

At the third step, as shown in FIG. 12, lens holders 46 and 75 housing a second lens 44 and a third lens 74, respectively, are inserted into the moving frames 47 and 76 in the zoom cam cylinder 19 and are preliminarily coupled with them by engaging nails 57 and engaged parts 60. Since highly accurate positioning is thus achieved between the cylinders 14 and 19 and the lens holders 46 and 75, the optical performance of the second lens group 10 and the third lens group 11 can be improved.

At the fourth step, the lens holders 46 and 75 are rotated in the respective cylinders 47 and 76 to adjust the inclination of the holders relative to the optical axis 21. When the lens holders 46 and 75 are thus rotated, parts of the holders are moved in different directions along the optical axis 21 depending on the abutment between ribs 65 to 67 and abutting parts 68 to 70. Therefore, the inclination can be easily and accurately adjusted.

At the fifth step, a nozzle for an adhesive is inserted into holes 14a and 19a to pour an adhesive 62 into holes 58a in the coupling bosses 58 of the moving frames 47 and 76. The lens holders 46 and 75 and the moving frames 47 and 76 are completely coupled when the adhesive 62 sets. The sixth through ninth steps are thereafter performed to mount a zoom ring 20, to attach a relay cylinder 16 to the fixed cylinder 14, to mount a focus cylinder 15 and a focus ring 18, and to mount an outer cylinder 17, respectively, which completes a zoom lens device 3.

Figure 13:
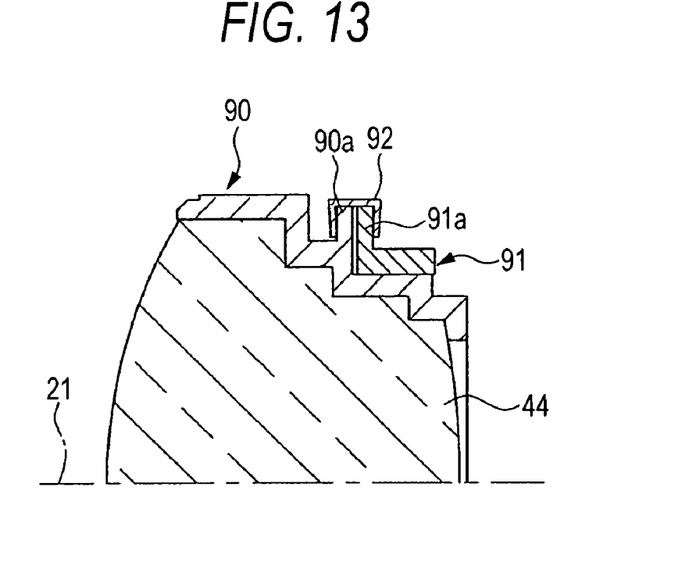
FIG. 13 is a sectional view of major parts showing a method of preliminarily coupling a movable frame and a lens holder according to another illustrative, non-limiting embodiment of the invention.

In the above-described embodiment, the parts 60 to be engaged on the lens holder 46 and the engaging nails 57 on the moving frame 47 are engaged with each other to achieve preliminary coupling. Alternatively, as shown in FIG. 13, a lens holder 90 and a moving frame 91 may be provided with protrusions 90a and 91a, respectively, on the outer circumferences thereof and may be coupled with each other by sandwiching the protrusions 90a and 91a with an elastic body 92 constituted by a metal thin plate.

Figure 14:
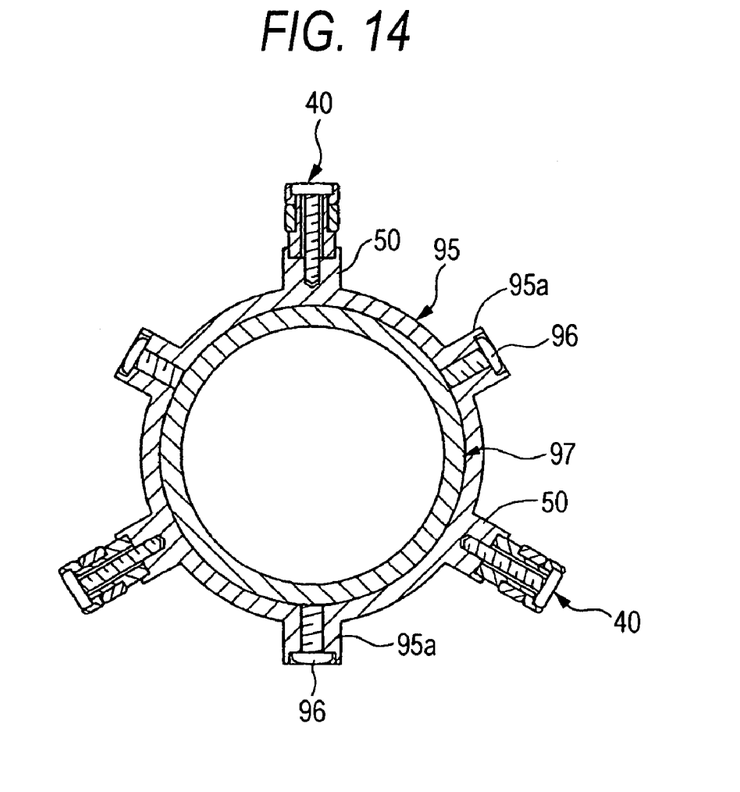
FIG. 14 is a sectional view of major parts showing a method of completely coupling a movable frame and a mirror chamber according to still another illustrative, non-limiting embodiment of the invention.

An adhesive is used to couple the lens holder 46 and the moving frame 47 completely in the above-described embodiment. Alternatively, as shown in FIG. 14, screws 96 may be threaded into coupling bosses 95a formed on the outer circumference of a moving frame 95 and put in abutment on a lens holder 97 to achieve complete coupling. A further adjustment may be performed by increasing or decreasing the amount of protrusion of the screws 96 after adjusting the inclination of the lens holder 97 by the effect of abutment between ribs on the lens holder 97 and abutting parts on the moving frame 95. As a result, a wide range of adjustment can be performed.

In the above-described embodiment, the lens supporting frame has three ribs and abutting parts. Alternatively, the lens supporting frame may have three or more ribs and abutting parts.

While a zoom lens device in a projector has been referred to in each of the above-described embodiments, the invention may be applied to other optical apparatus such as cameras.

While the invention has been described in detail and with reference to specific embodiments thereof, it will be apparent to one skilled in the art that various changes and modifications can be made therein without departing from the spirit and scope thereof.

The entire disclosure of each and every foreign patent application from which the benefit of foreign priority has been claimed in the present application is incorporated herein by reference, as if fully set forth herein.

What is claimed is:

1. A lens supporting frame of a lens device, the lens device comprising:
   a plurality of lens groups each including at least one lens and the lens supporting frame, the lens supporting frame supporting the at least one lens and having a plurality of cam followers at an outer circumference thereof;
   a cam cylinder having a plurality of cam grooves engaging with the cam followers,
   wherein the cam followers are pressed by the cam grooves as a result of a rotation of the cam cylinder to move each of the lens groups in a direction along an optical axis, the lens supporting frame comprising:
   a lens holder supporting the at least one lens;
   a moving frame supporting the lens holder and having the plurality of cam followers at the outer circumference thereof, wherein
   one of the lens holder and the moving frame has ribs each having a surface that is inclined in a direction along the optical axis and disposed along a rotation direction of the optical axis, and
   the other of the lens holder and the moving frame has abutting parts abutting on the ribs;
   the inclination of said ribs being such that rotation of the lens holder and the moving frame relative to each other tilts the lens holder relative to the optical axis.

2. The lens supporting frame according to claim 1, wherein the ribs are disposed at equal intervals in the rotation direction, and the abutting parts are disposed at the equal intervals in the rotation direction.

3. The lens supporting frame according to claim 1, wherein each of the ribs has a plurality of surfaces including: a first surface inclined in one direction along the optical axis; and a second surface inclined in the other direction along the optical axis, and the plurality of surfaces are serially arranged in the rotation direction.

4. The lens supporting frame according to claim 3, wherein at least one of the surfaces in each of the ribs is inclined in one direction along the optical axis, and a surface in another of the ribs corresponding to the at least one of the surfaces is inclined in the other direction along the optical axis.

5. The lens supporting frame according to claim 1, which comprises a preliminary coupling unit that preliminary couples the lens holder and the moving frame such that the lens holder can move in directions along the optical axis.

6. The lens supporting frame according to claim 5, wherein the preliminary coupling unit comprises: an engaging part disposed on one of the lens holder and the moving frame; and a part engaged with the engaging part, the part being disposed on the other of the lens holder and the moving frame.

7. The lens supporting frame according to claim 5, wherein the preliminary coupling unit comprises: parts to be sandwiched, one of the parts being disposed in a position of the lens holder, the other of the parts being disposed in the corresponding position of the moving frame; and an elastic member for elastically sandwiching the parts to be sandwiched in directions along the optical axis.

8. The lens supporting frame according to claim 1, wherein the lens holder and the moving frame are coupled with an adhesive.

9. The lens supporting frame according to claim 1, wherein the moving frame has a plurality of screw holes disposed radially of the optical axis, and an end of a screw engaged with at least one of the screw holes is put in abutment on an outer circumferential surface of the lens holder to couple the lens holder and the moving frame.

10. The lens supporting frame according to claim 1, wherein the number of the ribs is at least three.

11. A method of adjusting a lens supporting frame of a lens device according to claim 1, which comprises:
   mounting the lens holder in the moving frame that is mounted in the cam cylinder; and
   rotating the lens holder in the moving frame to move the lens holder in a direction along the optical axis through abutment between the ribs and the abutting parts.

12. The method according to claim 11, which comprises increasing or decreasing an amount of abutment between a screw engaged with the moving frame and the lens holder after the abutment between the ribs and the abutting parts, so as to perform a further adjustment of the lens supporting frame and to couple the moving frame and the lens holder.

* * * * *